(12) United States Patent
Wise et al.

(10) Patent No.: US 10,841,241 B2
(45) Date of Patent: Nov. 17, 2020

(54) INTELLIGENT PLACEMENT WITHIN A DATA CENTER

(71) Applicant: MICROSOFT TECHNOLOGY LICENSING, LLC, Redmond, WA (US)

(72) Inventors: Michael Anthony Wise, Langen (DE); Alex Lee, Silver Spring, MD (US); Bruce E. Johnson, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/295,909

(22) Filed: Mar. 7, 2019

(65) Prior Publication Data

US 2019/0207869 A1 Jul. 4, 2019

Related U.S. Application Data

(63) Continuation of application No. 14/658,030, filed on Mar. 13, 2015, now Pat. No. 10,243,879.

(51) Int. Cl.
| | |
|---|---|
| *H04L 12/911* | (2013.01) |
| *H04L 29/08* | (2006.01) |
| *H04L 12/24* | (2006.01) |
| *G06F 9/50* | (2006.01) |

(52) U.S. Cl.
CPC .......... *H04L 47/823* (2013.01); *G06F 9/5027* (2013.01); *G06F 9/5061* (2013.01); *G06F 9/5066* (2013.01); *G06F 9/5072* (2013.01); *H04L 41/5009* (2013.01); *H04L 47/822* (2013.01); *H04L 67/16* (2013.01)

(58) Field of Classification Search
CPC . H04L 47/823; H04L 47/822; H04L 41/5009; H04L 67/16; G06F 9/5027; G06F 9/5061; G06F 9/5066; G06F 9/5072
See application file for complete search history.

(56) References Cited

U.S. PATENT DOCUMENTS

| | | | |
|---|---|---|---|
| 10,243,879 B2* | 3/2019 | Wise | G06F 9/5066 |
| 2008/0052719 A1* | 2/2008 | Briscoe | H04L 41/0856 |
| | | | 718/104 |
| 2009/0276771 A1* | 11/2009 | Nickolov | H04L 67/1014 |
| | | | 717/177 |
| 2011/0029882 A1* | 2/2011 | Jaisinghani | G06F 11/203 |
| | | | 715/736 |

* cited by examiner

Primary Examiner — Kristie D Shingles
(74) Attorney, Agent, or Firm — Workman Nydegger

(57) ABSTRACT

An intelligent placement engine generates a placement map that provides a configuration for deploying a service based at least in part, on one or more configuration parameters. A data center in which the service is to be hosted is defined using a data center definition, while the service is defined using a service definition. The configuration parameters include estimated probabilities calculated based on estimated resource consumption data. The resource consumption data is estimated based at least in part on historical data distributions.

19 Claims, 12 Drawing Sheets

INTELLIGENT PLACEMENT WITHIN A DATA CENTER

CROSS-REFERENCE TO RELATED APPLICATIONS

This application is a continuation of U.S. patent application Ser. No. 14/658,030 filed on Mar. 13, 2015, entitled "INTELLIGENT PLACEMENT WITHIN A DATA CENTER," which application is expressly incorporated herein by reference in its entirety.

BACKGROUND

Cloud-based services are continuing to gain in popularity. More and more applications are being implemented as cloud-based services, which makes the applications easily available to a large number of users. Cloud-based services are typically deployed via a data center, which may house any number of cloud-based services for any number of service providers. In developing a cloud-based service, a service provider may specify various rules and requirements for the service. The service provider may contact a data center provider to request that the service be implemented. A data center typically includes multiple servers, each of which may include any number of virtual machines. Deploying a cloud-based service is a complex process in which consideration must be given to the various rules and requirements of each service that is hosted, while satisfying various service level agreements, and preferably minimizing cost and resource allocation.

SUMMARY

Intelligent placement within a data center is described. Rules and requirements for a data center are specified in a data center definition and rules and requirements for a service to be hosted by the data center are specified in a service definition. A placement map is generated to facilitate deployment of the service within the data center. The placement map is generated based on configuration parameters that enable the service to be deployed based on any combination of configuration parameters such as, monetary cost and system performance. Data distributions based, at least in part, on historical operational data provide a basis for the configuration parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features and components.

DETAILED DESCRIPTION

The placement of multiple heterogeneous workloads on physical components of a data center is a complex process in which various different considerations exist. Data center architects and data center administrators are typically concerned with how deploying a particular service via the data center will impact the performance of the data center. Service architects and service administrators are typically concerned with having their service deployed in a way in which the service performance will be satisfactory to the users of the service. Intelligent placement within a data center, as described herein, considers the rules and requirements of the data center and the rules and requirements of the requested service in determining a deployment plan for the requested service.

A data center provides various resources that can be used to support hosting various services. Configuring a service deployment within a data center includes balancing available resources with the demand for the resources. Unbalanced resource supply and demand results in waste (if the supply is significantly greater than the demand) or poor service quality (if the demand is greater than the supply). However, resource supply and demand are not always measureable.

A resource supply can consist of many components. Of particular interest is any system component that can become a bottleneck. The described intelligent placement engine analyzes the performance of system components at multiple potential bottlenecks, and combines the data to facilitate a balance between resource supply and demand. In example implementations, a transfer function is generated to estimate resource consumption based on estimated resource demand. Such a transfer function may be based, for example, on a best fit log normal distribution of historical data. Deployment of a service can be modeled based on objective functions such as cost, availability, or resource consumption while simultaneously satisfying the many constraints of the data center and any services that are deployed via the data center.

Configuring a service deployment based on estimated resource demand and estimated resource consumption provides an increased probability that once deployed, a service will satisfy service level agreements considered during the configuration process.

Figure 1:
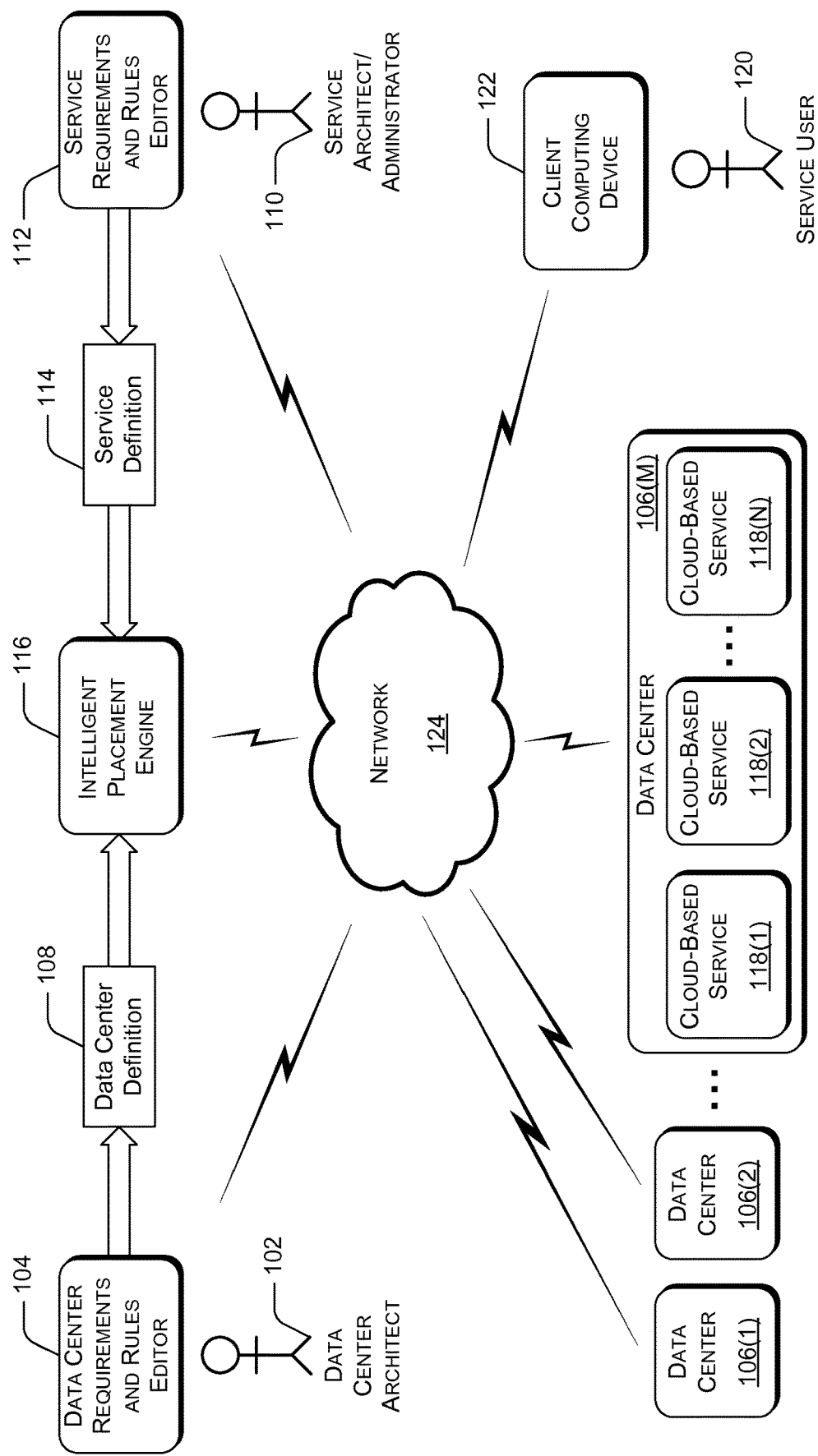
FIG. 1 is a pictorial diagram of an example computing environment that implements intelligent placement within a data center.

FIG. 1 illustrates an example environment 100 for implementing intelligent placement within a data center. In the illustrated example, a data center architect 102 interacts with data center requirements and rules editor 104 to define a data center. Based at least in part on the input from the data center architect 102, a data center 106 is implemented and a data center definition 108 is generated. The data center definition 108 can include, for example, data describing any one or more of a number of physical locations, a number of actual racks per location, a maximum number of racks per location, availability and fault domains, specifications of computational units (e.g., CPU, memory, and storage capacity), specifications of storage units, storage capacity, network specifications, physical security domains (e.g., rack and sub-datacenter), heating and cooling load and capacity, power requirements of each component, and cost of each component.

A service architect/administrator 110 interacts with service requirements and rules editor 112 to request that a service be hosted by the data center. Based at least in part on the input from the service architect/administrator 110, a service definition 114 is generated. The service definition 114 can include, for example availability requirements such as percentage uptime, high availability (HA) requirements such as a recovery time objective (RTO) and/or a recovery point objective (RPO), possible server architectures (which may, for example, be dependent upon a service level agreement (SLA), an RTO, and/or an RPO, availability domain rules, geographic requirements (e.g., user distribution and latency requirements), compliance requirements (e.g., FedRAMP, FISMA, HIPPA, ISA27001), network latency, bandwidth and maximum network loss requirements, storage capacity requirements, and service-specific requirements. Intelligent placement engine 116 receives data center definition 108 and service definition 114, and facilitates deployment of a cloud-based service 118, which is hosted by a data center 106 and accessible to a service user 120, for example, via a client computing device 122. A network 124 enables communication between data center requirements and rules editor 104, intelligent placement engine 116, service requirements and rules editor 112, data center(s) 106, cloud-based service(s) 118, and client computing device 122.

In an example implementation, service requirements and rules editor 112 enables a service architect/administrator 110 to define various types of services, which may include, for example, a workload, a service plan, and/or a service offering.

Figure 2:
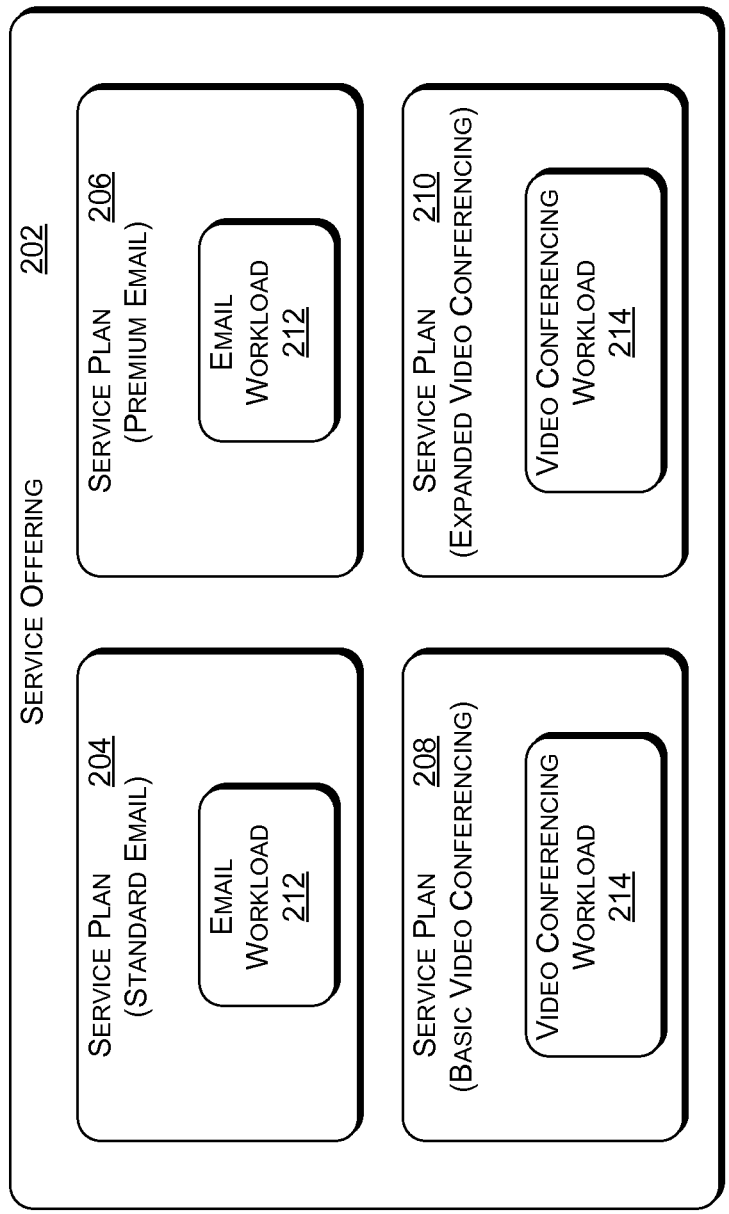
FIG. 2 is a block diagram of an example service offering that is based on service plans and workloads.

FIG. 2 illustrates an example service offering example service plans, and example service workloads that can be defined via the service requirements and rules editor 112. In the illustrated example, service offering 202 includes two email service plans 204 and 206 and two video conferencing service plans 208 and 210. In this example, standard email service plan 204 and premium email service plan 206 are both based on the same email workload 212. Similarly, basic video conferencing service plan 208 and expanded video conferencing service plan 210 are both based on the same video conferencing workload 214 in this example.

In the illustrated example, a workload provides a definition of rules and requirements that will apply to all service plans that are based on the workload. For example, email workload 212 can include the quantity of server types, the infrastructure requirements of each server type, the distribution of server types, and the connectivity of server types to each other and to other datacenter components such as network and storage. A service plan provides additional rules and requirements that define a particular implementation of a workload. For example, standard email service plan 204 and premium email service plan 206 are both based on email workload 212, but each define additional rules and requirements that are specific to the respective service plan. For example, standard email service plan 204 may specify placement of the workload into a specific datacenter, configuration of a specific amount of storage, or disabling specific features (e.g., encryption capabilities, email read receipts, etc.). In contrast, premium email service plan 206 may specify placement of the workload into multiple datacenters, providing additional capacity by modifying the characteristics of the server types or by increasing the quantity of servers, or enabling additional features.

As another example, an email workload specification may indicate how much storage would be needed to accommodate how many messages, or how much CPU or network bandwidth is required per new message. An email service plan based on the email workload may then specify how many messages are allowed to be retained for how long per user.

Similarly, basic video conferencing service plan 208 and expanded video conferencing service plan 210 are both based on video conferencing workload 214, but each define additional rules and requirements that are specific to the respective service plan. In an example implementation, a particular service request may be defined by a service architect/administrator 110 or may be selected from a predefined service offering, such as service offering 202.

A service architect/administrator 110, as illustrated in FIG. 1, may represent a service architect who defines a particular workload, a service administrator who defines or selects a particular service plan, which may be based, at least in part, on an existing workload, or a service offering designer who defines a service offering, which may be based, at least in part on one or more existing workloads and/or one or more existing service plans.

Figure 3:
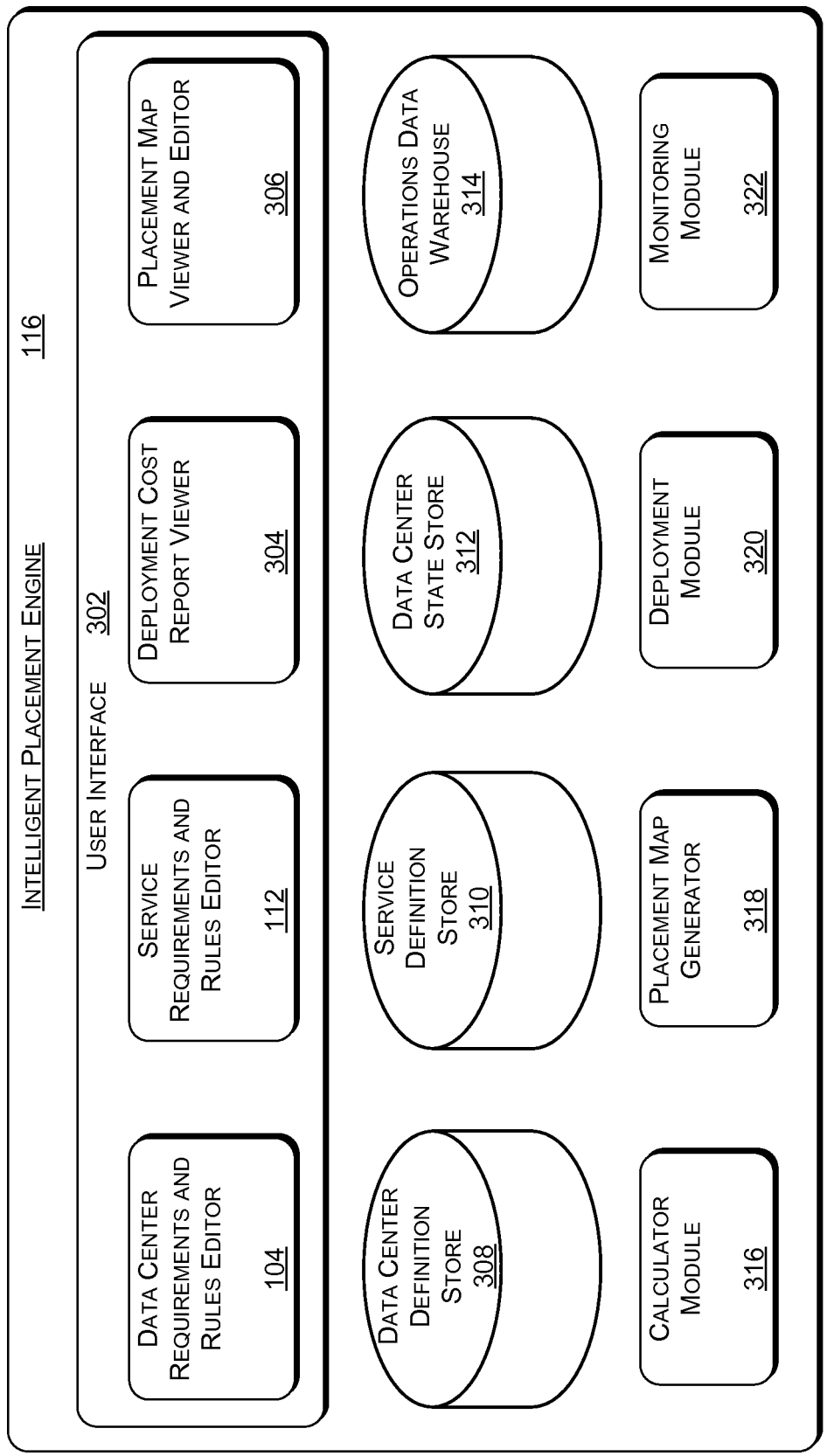
FIG. 3 is a block diagram of selected components of an example intelligent placement engine.

FIG. 3 illustrates select components of an example intelligent placement engine 116. In the illustrated example, intelligent placement engine 116 includes a user interface component 302, which includes data center requirements and rules editor 104, service requirements and rules editor 112, deployment cost report viewer 304, and placement map viewer and editor 306. As described above, data center requirements and rules editor 104 enables a data center architect to define a data center, and service requirements and rules editor 112 enables a service architect/administrator to define a service. Deployment cost report viewer 304 is configured to present a proposed cost report in response to receiving a request to host a service within a data center. Placement map viewer and editor 306 is configured to present a proposed placement map, which provides a visual representation of various components of a data center and services hosted by the data center.

Example intelligent placement engine 116 also includes data center definition store 308, service definition store 310, data center state store 312, and operations data warehouse 314. Data center definition store 308 maintains, for each data center 106, a data center definition, for example, as received through data center requirements and rules editor 104. Service definition store 310 maintains, for each service 118 hosted by a data center 106, a service definition, for example, as received through service requirements and rules editor 112. Data center state store 312 maintains data that describes a present state of each data center 106. A present state of a particular data center may include, for example, data indicating which services 118 are hosted by the particular data center and how components of the hosted services are distributed among physical and virtual components of the data center. Operations data warehouse 314 maintains data gathered over time as the intelligent placement engine 116 monitors the data centers 106 and the hosted services 118.

Example intelligent placement engine 116 also includes a calculator module 316, a placement map generator 318, a deployment module 320, and a monitoring module 322. Calculator module 316 generates a model based on one or more of a service definition for a requested service received through service requirements and rules editor 112, a data center definition received through data center requirements and rules editor 104 or maintained in data center definition store 308, and the present state of the data center as maintained in data center state store 312. Placement map generator 318 analyzes the model generated by the calculator module 316, and generates a placement map for presentation via the placement map viewer and editor 306. Deployment module 320 implements the requested service within the data center based on the placement map. In an example implementation, a data center administrator can manually modify and/or approve the placement map prior to the deployment module 320 implementing the requested service. Monitoring module 322 gathers performance data over time as the data center operates and as users access the hosted services. Placement map generator 318 utilizes the performance data gathered by the monitoring module 322 to improve service deployments, as measured in terms of, for example, monetary cost, service availability, and/or data center resource consumption over time.

The techniques described herein can be used to deploy a new service within an existing data center. The techniques described herein can also be used to implement a new data center based, at least in part, on rules and requirements associated with one or more services that are likely to be hosted by the new data center.

Figure 4:
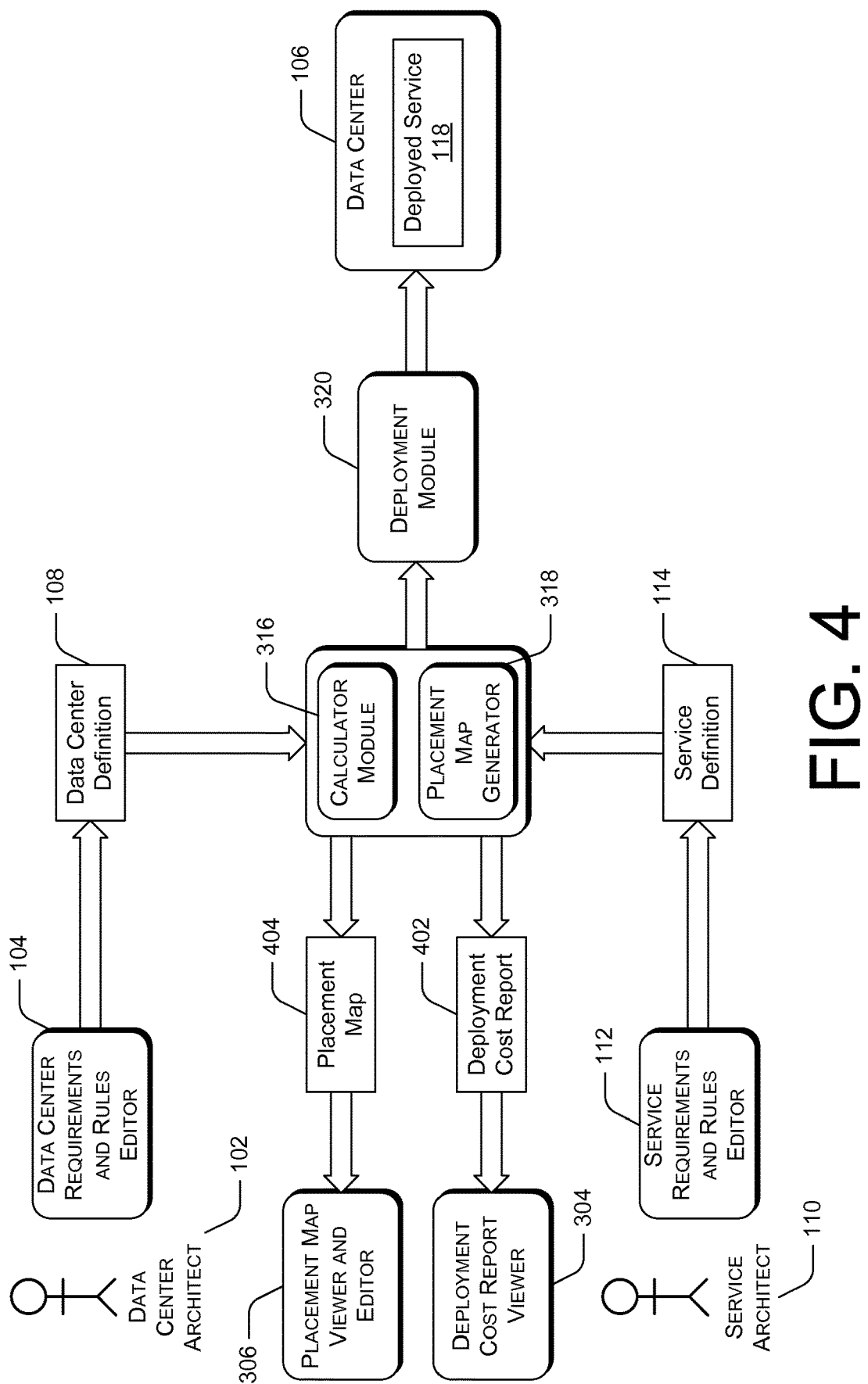
FIG. 4 is a block diagram illustrating data flow through select components of an example intelligent placement engine.

FIG. 4 illustrates an example process flow amongst select components of an intelligent placement system to deploy a new data center (or a new stack within an existing data center) hosting a new service. According to the illustrated example, a data center architect 102 creates a data center definition 108 through data center requirements and rules editor 104, and a service architect 110 creates a service definition 114 through service requirements and rules editor 112. Calculator module 316 generates a model of a data center that complies with the data center definition 108 and that hosts a service according to service definition 114. Placement map generator 318 generates a placement map based on the model and one or more configuration parameters. A deployment cost report 402 and a placement map 404 are the result. In this example, service architect 110 can review and approve the deployment cost report 402 through deployment cost report viewer 304. Similarly, data center architect 102 can review and approve the placement map 404 through placement map viewer and editor 306.

Data center 106 is then constructed according to the data center definition 108 and the placement map 404, and deployment module 320 deploys the requested service 118 according to the placement map 404.

Figure 5:
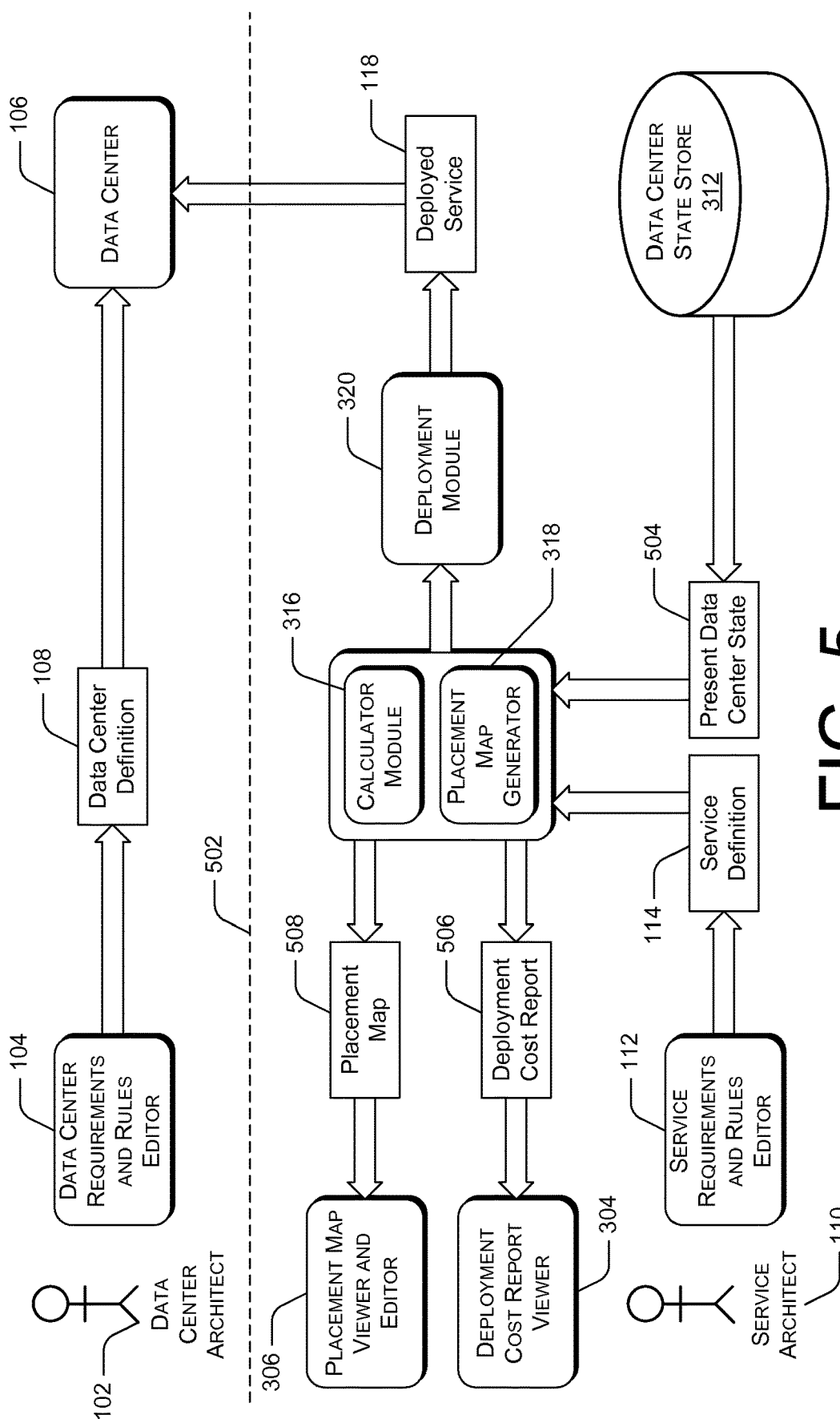
FIG. 5 is a block diagram illustrating data flow through select components of an example intelligent placement engine.

FIG. 5 illustrates an example process flow amongst select components of an intelligent placement system to deploy a new service within an existing data center. Dashed line 502 indicates that the processing shown above the line 502 can be performed independent of (i.e., with or without) the processing shown below the line, and vice versa. In the illustrated example, a data center architect 102 creates a data center definition 108 through data center requirements and rules editor 104. A data center 106 is then constructed according to the data center definition 108. In an example implementation, a data center may have already been implemented, rather than being created through the intelligent placement system as shown in FIG. 5. In this scenario, the intelligent placement system may create a data center definition based on the existing data center. The intelligent placement system may also create service definitions for any existing services deployed through the existing data center, and may determine a present state of the data center.

The processing shown below the line is then performed to deploy a service 118 within the data center 106 that was constructed. In the illustrated example, a service architect 110 creates a service definition 114 through service requirements and rules editor 112. Calculator module 316 accesses the present data center state 504 from data center state store 312, and generates a model of a data center that hosts a service according to service definition 114. Placement map generator 318 generates a placement map based on the model and one or more configuration parameters. A deployment cost report 506 and a placement map 508 are the result. In this example, service architect 110 can review and approve the deployment cost report 506 through deployment cost report viewer 304. Similarly, data center architect 102 can review and approve the placement map 508 through placement map viewer and editor 306. Deployment module 320 deploys the requested service 118 according to the placement map 508.

Figure 6:
FIG. 6 is a pictorial diagram of an example data center model.

FIG. 6 provides a visual representation of example data center state data 504 that may be maintained by data center state store 312. As illustrated in FIG. 6, data center state data may be represented as a hierarchy with a data center provider 602 at the root. Any number of data centers, such as data centers 604(1) and 604(2) are represented as children of the data center provider 602. Each data center includes any number of racks, such as racks 606(1), 606(2), 606(3), and 606(4) of data center 604(1). Each rack 606 houses any number of physical hosts. For example, as illustrated in FIG. 6, rack 606(1) houses physical hosts 608(1), 608(2), 608(3), and 608(4). Each physical host includes any number of virtual machines, which are illustrated in FIG. 6 as the smaller rectangles, each with any of a variety of hash marks. In FIG. 6, the different hash marks each represent the set of virtual machines required to deliver the capabilities defined by the service definition 114. Examples of virtual machine types include, but are not limited to, front end (e.g., web front-end servers that serve web pages), middle tier (e.g., application servers that host computation-intensive applications), and back end (e.g., database servers that host relational databases serving data to machines with different VM types.

Figure 7:
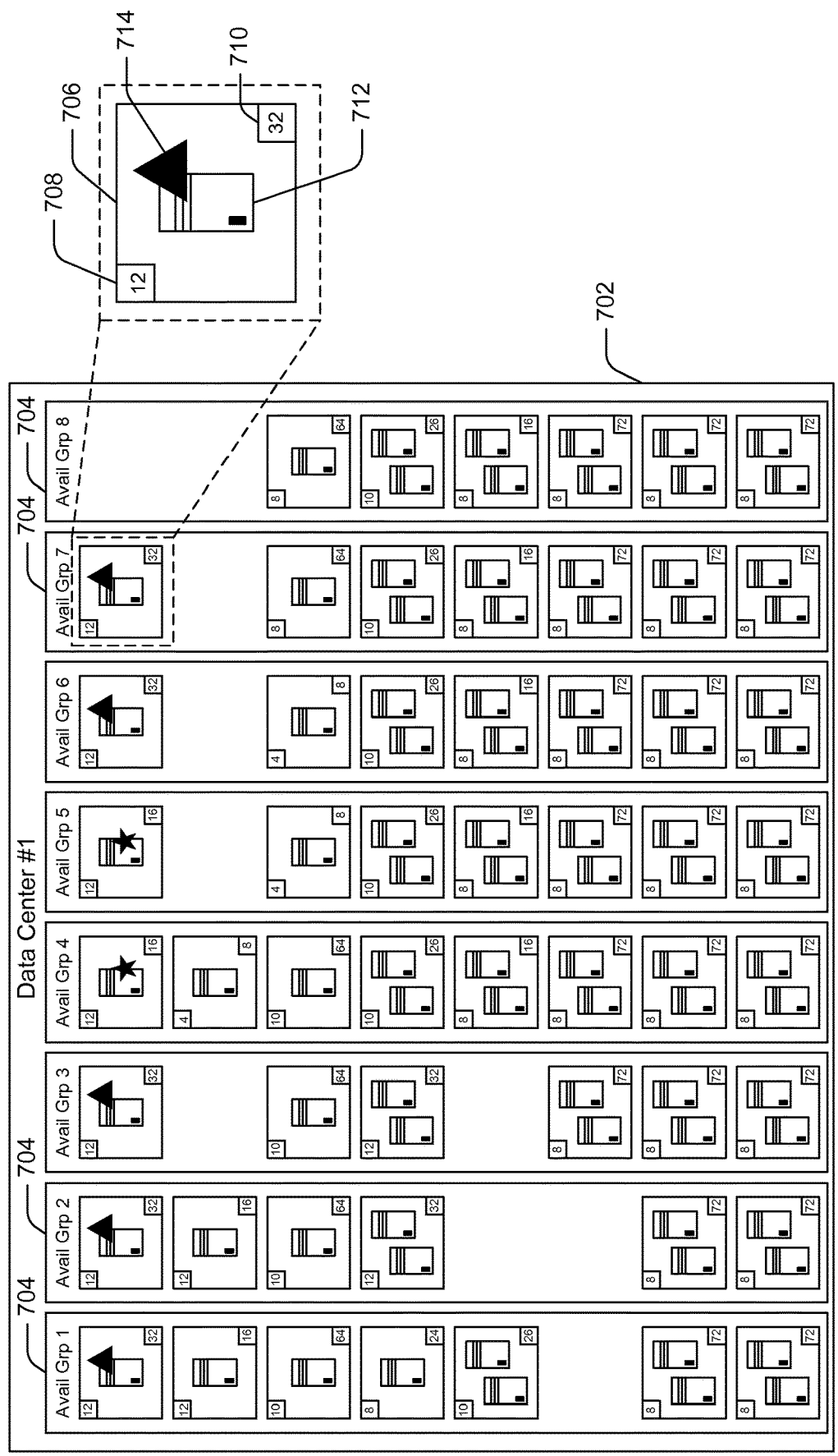
FIG. 7 is a pictorial diagram of an example placement map.

FIG. 7 illustrates an example representation of a placement map 702, which is representative of placement map 404 or placement map 508. In the illustrated example, placement map 702 provides a visual representation of a deployment plan for deploying a requested service within the data center. The placement map 702 illustrates multiple columns 704, each representing an availability group. Within each column, individual boxes, such as box 706 represent a physical server hosting virtual machines. Each box includes a smaller box in the upper left corner 708, which indicates the number of CPU cores consumed by the virtual machines hosted on the physical server. Similarly, each box includes a smaller box in the lower right corner 710, which indicates the amount of RAM consumed by the virtual machines hosted on the physical server. Image 712 represents a virtual machine, and icon 714 can be used to indicate the purpose associated with the virtual machine.

Other features that may be displayed in a placement map may include, but are not limited to, expected resource utilization (e.g., expressed as a percentage), power consumption, or derived financial metrics.

Figure 8:
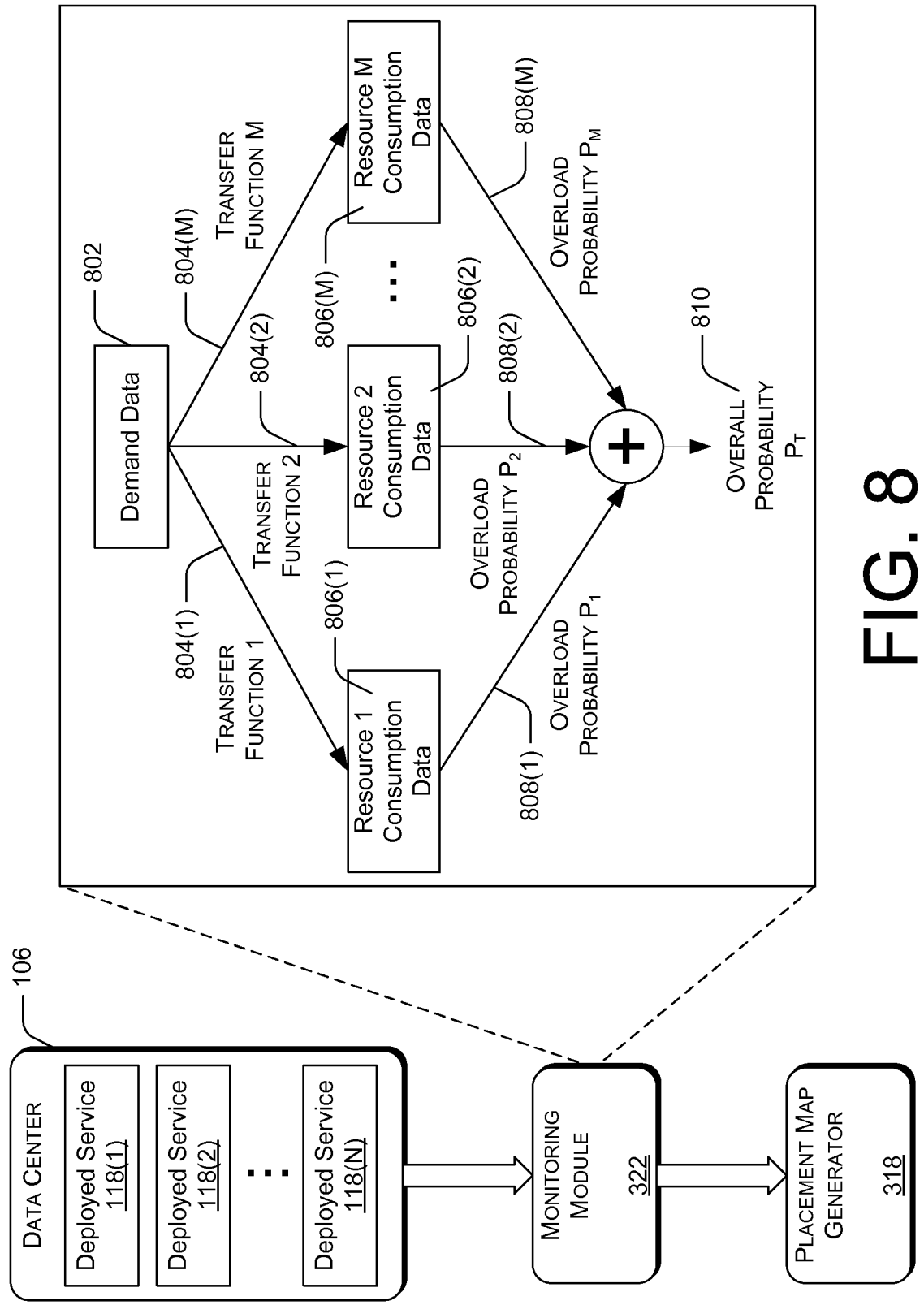
FIG. 8 is a block diagram illustrating an example calculation of a configuration parameter.

FIG. 8 illustrates processing performed by example monitoring module 322 in support of placement map generator 318. In the illustrated example, as described above, a data center 106 hosts any number of deployed services, such as deployed services 118(1), 118(2) . . . 118(N). Monitoring module 322 gathers and analyzes operations data over time as deployed services 118 are accessed by any number of users.

As shown in FIG. 8, monitoring module 322 records demand data 802, applies transfer functions 804 to the demand data 802 to estimate resource consumption data 806. The estimated resource consumption data 806 is analyzed to determine overload probabilities 808, which are then combined to determine an overall probability 810 that the system is overloaded.

Various techniques can be considered to monitor operations data in support of placement map generator 318. In an example, for each of a plurality of system components, monitoring module 322 gathers raw data that corresponds to the resource supply and raw data that corresponds to the resource demand. However, given the complexities of services deployed within a data center and the various states such a system can be in, there is not necessarily a direct relationship between resource supply and resource demand. That is, such a system shares many characteristics with a stochastic model, where a given demand level can produce any number of different resource consumption outcomes depending on the complex internal state of the system.

Given these complexities, rather than analyzing raw data directly, distributions based on the raw data can be used to identify the data of interest. For example, a Service Level Agreement (SLA) may specify that CPU usage will remain under 40 percent utilization. A distribution based on gathered raw data may show that, for example, the CPU usage is over 40 percent approximately 30 percent of the time.

While distribution curves may be more useful than the gathered raw data, maintaining such distribution curves is data intensive and can be cumbersome. However, essential data from the distribution curves can be extracted using various techniques such as, for example, a best fit normal curve, a best fit log normal curve, or a Mandelbrot power distribution. In an example implementation, standard integration techniques are applied to a best fit log normal curve to estimate an SLA violation, that is, the percentage of area under the curve that is above the capacity specified in the SLA. The result indicates an expected amount of time that the particular resource associated with the data will be over capacity.

As mentioned above, a distribution curve can be used to determine an SLA violation for an individual resource. However, as previously discussed, data centers hosting multiple services may include multiple potential resource bottlenecks. For example, a web farm may include at least two resources of interest. First, a CPU of front end tiers, and second, database disks. If either of these is overloaded, an SLA violation may occur. For this example, resource $R_1$ represents the CPU of the front tiers and resource $R_2$ represents the database disks. $P_1$ represents a probability that $R_1$ is overloaded and $P_2$ represents a probability that $R_2$ is overloaded. $P_1$ and $P_2$ are combined based on the assumption that the probabilities are uncorrelated. That is, the system is considered overloaded if either $R_1$ or $R_2$ is overloaded. Accordingly, the total probability that the system is overloaded, $P_T$, is given by:

$$P_T = P_1 + P_2 - P_1 * P_2$$

It follows that if data is gathered for three resources, $R_1$, $R_2$, and $R_3$, having corresponding probabilities, $P_1$, $P_2$, and $P_3$, the total probability, $P_T$, that at least one component of the system is overloaded is given by:

$$P_T = P_1 + P_2 + P_3 - P_1 * P_2 - P_2 * P_3 - P_3 * P_1 + P_1 * P_2 * P_3$$

Accordingly, probabilities can be accumulated for any number of potential resource bottlenecks to calculate an overall probability that at least one component of the system will be overloaded.

The probability calculations described above require a knowledge of resource consumption as a function of varying demand. In the described example implementation, a resource consumption function is approximated by a log normal function for which the shape parameter of the log normal remains essentially constant as the load varies and the geometric mean varies linearly as the load varies. Accordingly, although the absolute magnitude of the resource consumption will vary linearly as the demand varies, the shape of the distribution will remain essentially the same.

As is well-known, a normal curve is characterized by the mean and the standard deviation. In contrast, a log normal curve is characterized by the geometric mean and the shape parameter. The shape parameter is unit-less and essentially describes how "fat" the tail to the right is. The shape parameter is calculated in a similar way to the standard deviation of a normal curve.

As shown in FIG. 8, an example intelligent placement engine uses transfer functions 804 to monitor potential resource bottlenecks. A transfer function 804 describes a relationship between demand 802 and resource consumption 806 using log normal curves. For each potential resource bottleneck that is modeled, there is a linear mapping defined from the average demand value to the geometric mean of the resource consumption with a constant shape factor. In an example implementation, demand is measured in requests per second (RPS) or number of distinct users. Resource consumption data 406 that may be estimated include, for example, CPU percentage, cores, CPU GHz, disk transfers per second, and memory. Furthermore, each potential resource bottleneck may be associated with a group. For example, groups may include a web front end (WFE), and application group (APP), and index group (IDX), or a Microsoft SQL-Server group (SQL).

In an example implementation, the resource consumption 806 is estimated as a function of the demand 802 using a linear transformation, such as an affine transformation. A transfer function 804 may be based on a regression set using values from a regression analysis of actual data from a working system. Alternatively, a transfer function may be based on a set of manually entered values, for example, edited regression values. In an example implementation, when implementing a new data center for which no data is available, archived data from another data center can be used as the initial data until enough data from the new deployment becomes available. In at least one example, a first transfer function is calculated using a regression set. The transfer function is then modified so that the resource consumption values estimated by the transfer function are greater than any of the actual measured values, increasing the probability that placement maps generated based on the estimated resource consumption values will result in service deployments that comply with the service rules and requirements specified in the service definition. Machine learning techniques may be employed to improve the transfer functions, as actual use data is gathered over time.

Figure 9:
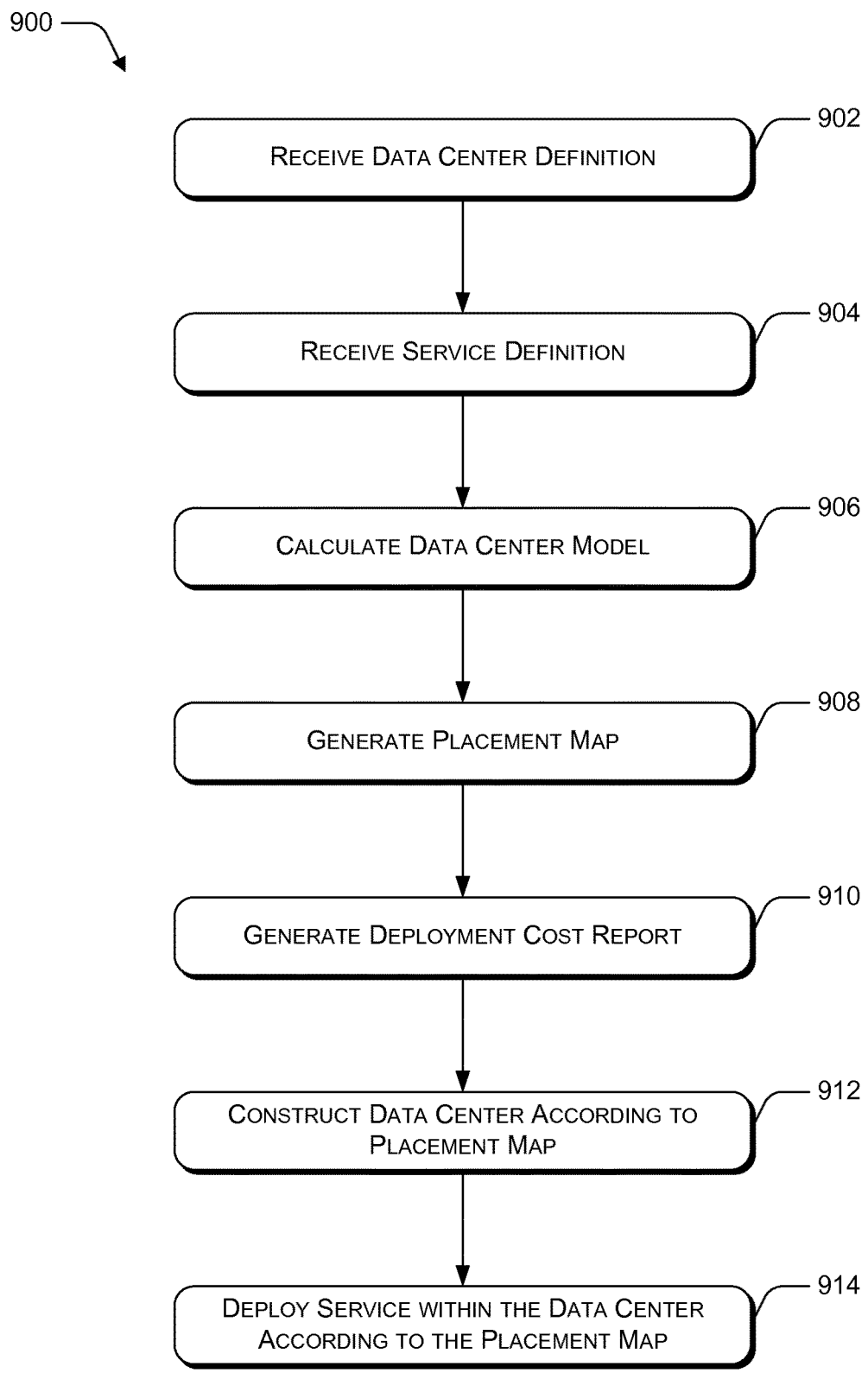
FIG. 9 is a flow diagram of an example method of constructing a data center and deploying a service.
Figure 10:
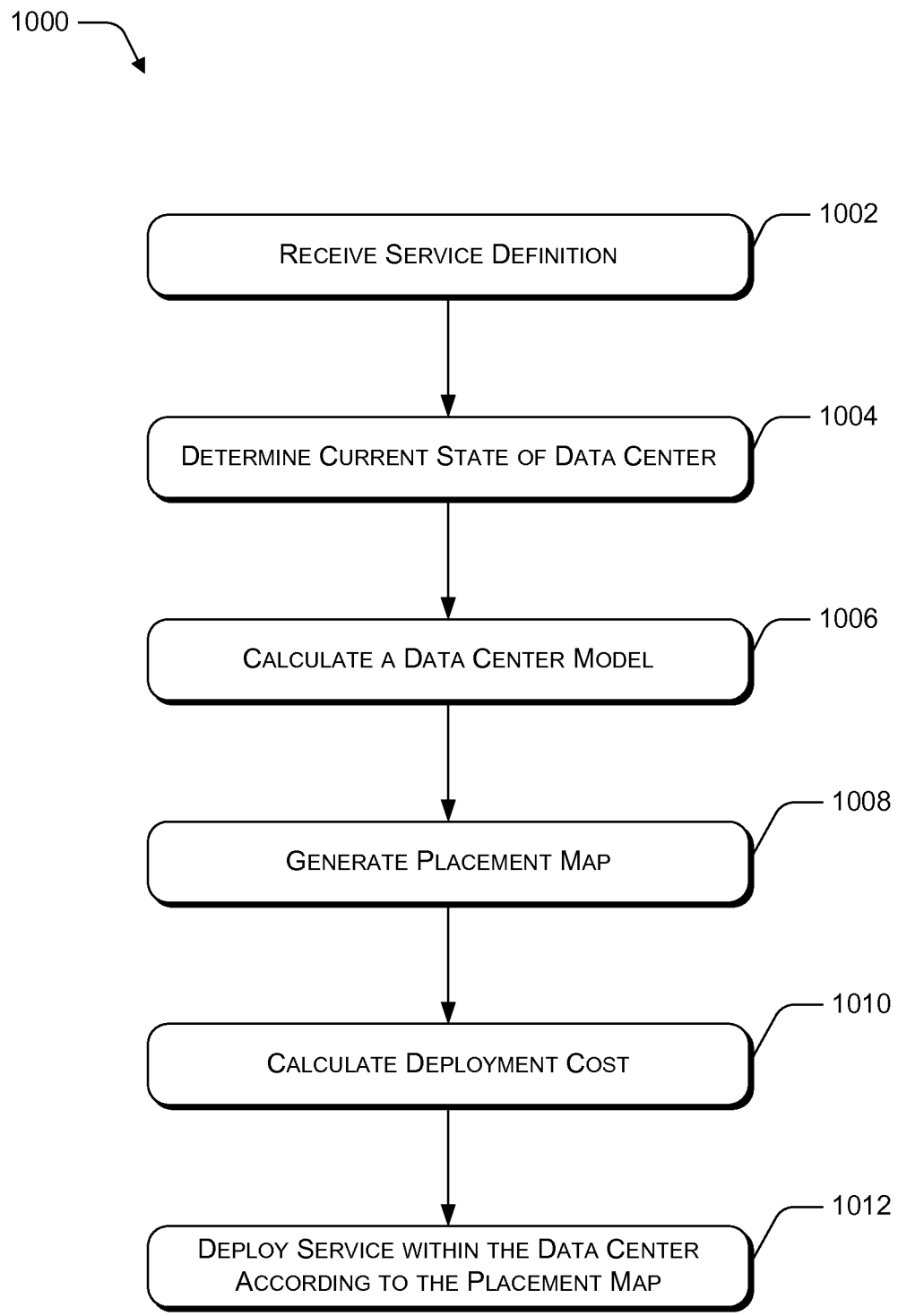
FIG. 10 is a flow diagram of an example method of deploying a service.
Figure 11:
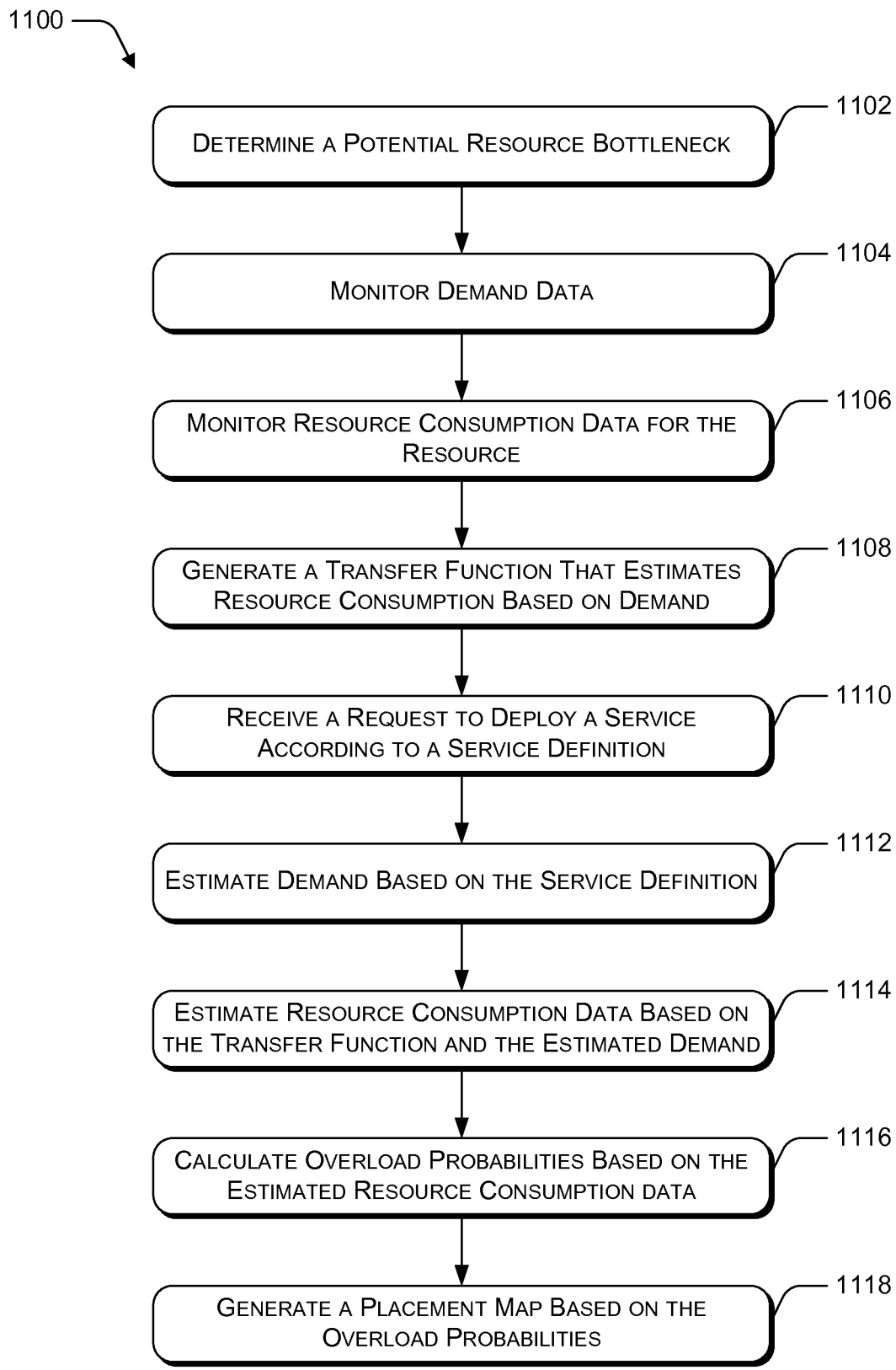
FIG. 11 is a flow diagram of an example method of calculating a configuration parameter and generating a placement map based on the configuration parameter.

FIGS. 9-11 illustrate example processes for configuring deployment of services within a data center based on a service definition and a data center definition. The processes are illustrated as sets of operations shown as discrete blocks. The processes may be implemented in any suitable hardware, software, firmware, or combination thereof. The order in which the operations are described is not to be construed as a limitation.

FIG. 9 illustrates an example process 900 for constructing a data center that hosts a service. At block 902, a data center definition is received. For example, a data center architect 102 submits data center rules and requirements through a data center requirements and rules editor 104.

At block 904, a service definition is received. For example, a service architect 110 submits service rules and requirements through a service requirements and rules editor 112.

At block 906, a data center model is calculated. For example, calculator module 316 generates a model of a data center according to the received data center definition 108.

At block 908, a placement map is generated. For example, placement map generator 318 generates a placement map 404 that describes deployment of a service according to the service definition 114 within a data center according to the data center definition 108.

At block 910, a deployment cost report is generated. For example, calculator module 316 generates cost report 402 based, at least in part, on the placement map 404.

At block 912, a data center is constructed. For example, deployment module 320 constructs a data center 106 according to the placement map 404. In an example implementation, deployment module 320 constructs data center 106 after receiving approval of the placement map 404.

At block 914, a service is deployed within the data center that was constructed. For example, deployment module 320 deploys service 118 within data center 106 according to the placement map 404. In an example implementation, deployment module 320 deploys service 118 after receiving approval of the deployment cost report 402 and after receiving approval of the placement map 404.

FIG. 10 illustrates an example process 1000 for deploying a service within an existing data center. At block 1002, a service definition is received. For example, a service architect 110 submits service rules and requirements through a service requirements and rules editor 112.

At block 1004, a present state of the data center is determined. For example, calculator module 316 extracts data from data center state store 312.

At block 1006, a data center model is calculated. For example, calculator module 316 generates a model of the data center according to the present state of the data center.

At block 1008, a placement map is generated. For example, placement map generator 318 generates a placement map 508 that describes deployment of a service according to the service definition 114 within the data center.

At block 1010, deployment costs are calculated. For example, calculator module 316, with support from the deployment module 320, generates a deployment cost report 506 based, at least in part, on the placement map 508.

At block 1012, the service is deployed within the data center. For example, deployment module 320 deploys service 118 within data center 106 according to the placement map 508. In an example implementation, deployment module 320 deploys service 118 after receiving approval of the deployment cost report 506 and after receiving approval of the placement map 508.

FIG. 11 illustrates an example process 1100 for monitoring operational data to support placement map configuration and generation. At block 1102, a potential resource bottleneck is determined. For example, a data center architect or administrator can indicate one or more data center resource components as potential bottlenecks.

At block 1104, resource demand data is monitored. For example, monitoring module 322 periodically gathers data indicating requests per minute or a number of distinct users associated with the resource component identified as a potential resource bottleneck.

At block 1106, consumption data associated with the resource is monitored. For example, monitoring module 322 periodically gathers data that can be interpreted as resource consumption data. Resource consumption data may include, for example, percentage of CPU usage, number of cores being utilized, CPU speed, disk transfers per second, and memory access rates.

At block 1108, a transfer function that estimates resource consumption based on demand is generated. For example, a transfer function is generated to approximate a best fit log normal curve of the resource consumption data.

At block 1110, a request to deploy a service according to a service definition is received. For example, as described with reference to block 904 of FIG. 9 and block 1002 of FIG. 10, a service architect 110 submits service rules and requirements through a service requirements and rules editor 112.

At block 1112, demand is estimated based on the service definition. For example, a service definition may specify a maximum number of distinct users. Alternatively, or additionally, a service definition may be similar to service that has already been deployed, in which case monitored demand data (e.g., number of requests per second) may be used to estimate demand data for the service described by the service definition.

At block 1114, resource consumption data is estimated based on the transfer function and the estimated demand data. Estimated resource consumption data may also include estimated resource consumption correlations. For example, different services placed in the same virtual machine can be favorable or unfavorable, depending on the correlations between the resource consumption of each of the services.

At block 1116, overload probabilities are calculated based on the estimated resource consumption data. For example, integration techniques are applied to the estimated resource consumption data to estimate overload probabilities.

At block 1118, the estimated overload probabilities are used to generate a placement map. For example, if the overload probabilities are unacceptable, the placement map may be modified, and the overload probabilities re-calculated. This process may be repeated until a placement map results in acceptable overload probabilities. In an example implementation, mixed integer programming and/or simulated annealing is used to generate the placement map. In an example, a placement map may be generated to satisfy an SLA, given a fixed cost. Alternatively a placement map may be generated based on a minimum cost configuration that will result in an SLA being violated with a given probability.

Figure 12:
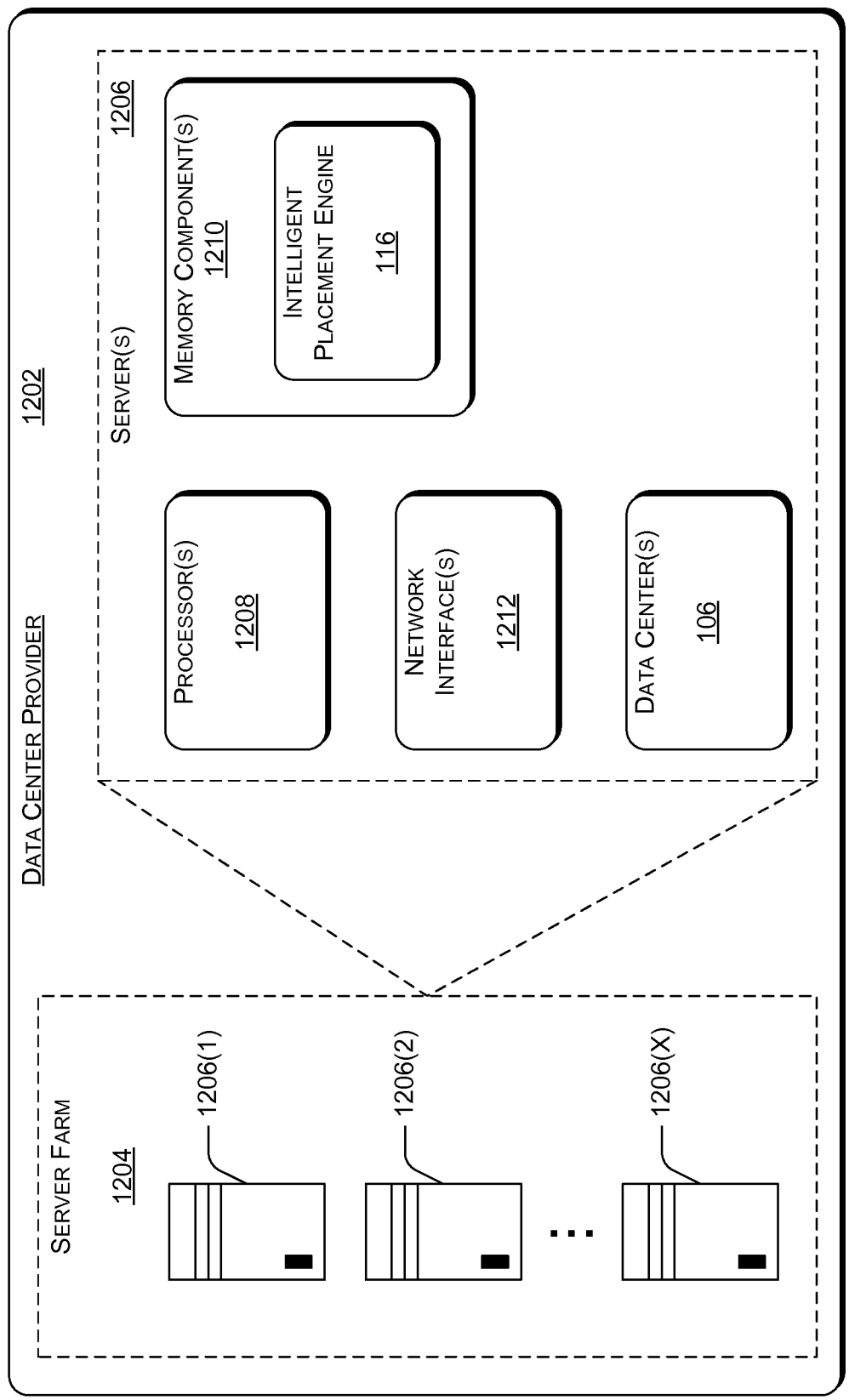
FIG. 12 is a block diagram of selected components of a data center provider that includes an intelligent placement engine.

FIG. 12 illustrates select components of an example data center provider 1202 that includes an intelligent placement engine 116. As illustrated in FIG. 12, data center provider 1202 includes a server farm 1204 that includes a plurality of servers 1206(1), 1206(2), . . . , 1206(X). The server farm provides various components that may be distributed across the servers 1206. These components include, for example, one or more processors 1208, memory component(s) 1210, network interface(s) 1212, and data center(s) 106. Network interfaces 1212 enable communication amongst components of the server farm 1204 and with other computing devices, such as client computing device 122 over a network such as network 124. Intelligent placement engine 116 is maintained in memory component(s) 1210 and executed on processor(s) 1208. Components of intelligent placement engine 116 may be distributed across multiple physical and/or virtual machines.

The functionality of the intelligent placement engine described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Although illustrated in FIG. 12 as being stored in memory components 1210 of server(s) 1206, intelligent placement engine 116, or portions thereof, may be implemented using any form of computer-readable media that is accessible by server(s) 1206 either locally or remotely, including over a network. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

EXAMPLE CLAUSES

A: A method comprising: receiving a request for a data center to host a service, the request including a service definition that specifies rules and requirements for the service; generating a model of the data center indicating resource allocations to support deployment of the requested service; calculating estimated data center resource consumption; generating a placement map based at least in part on the model and the estimated data center resource consumption; and deploying the service within the data center according to the placement map.

B: A method as Paragraph A recites, wherein: determining the data center comprises receiving a data center definition that specifies rules and requirements for a data center implementation; generating the model of the data center comprises generating the model based, at least in part on the data center definition; and deploying the service within the data center further comprises constructing the data center according to the data center definition.

C: A method as Paragraph B recites, wherein the data center definition includes data center rules and requirements comprising one or more of: a number of physical server locations; a number of actual racks per server location; a number of maximum racks per server location; a number of availability and fault domains; a number of compute units with central processing units (CPUs) and memory; a number of storage units with storage capacity; a number of networks with capacity; a number of physical security domains; heating and cooling load and capacity; power requirements per component; cost per component; a physical weight of each component; or a physical load capacity for each rack.

D: A method as any one of Paragraphs A-C recites, wherein: determining the data center comprises identifying an existing data center in which the service is to be deployed; and generating the model of the data center comprises determining a state of the data center.

E: A method as any one of Paragraphs A-D recites, wherein: the service definition comprises one or more of: service availability requirements; possible server architectures; service availability domain rules; geographic requirements; compliance requirements; network latency requirements; bandwidth requirements; maximum network loss requirements; storage capacity requirements; or service-specific requirements.

F: A method as any one of Paragraphs A-E recites, wherein generating the placement map comprises generating the placement map to favor at least one or more of: a monetary cost associated with deploying the service; estimated service availability; or estimated data center resource consumption.

G: A method as any one of Paragraphs A-F recites, wherein generating the placement map comprises: estimating data center resource demand data based, at least in part, on the service definition; applying a transfer function to the estimated resource demand data to estimate data center resource consumption data; calculating an data center resource overload probability based, at least in part, on the estimated data center resource consumption data; and generating the placement map based, at least in part, on the overload probability.

H: A method as Paragraph G recites, wherein the data center resource demand data comprises at least one of: requests per second; or number of distinct users.

I: A method as Paragraph G or Paragraph H recites, wherein the data center resource consumption data comprises one or more of: central processing unit (CPU) utilization percentage; a number of CPU cores; CPU speed; network bandwidth; network latency; storage capacity; disk transfers per second; or memory utilization.

J: A method as any of Paragraphs A-I recites, further comprising: performing the estimating, applying, and calculating for a particular data center resource of a plurality of data center resources; and calculating an overall probability of system overload by combining the calculated overload probabilities for the plurality of data center resources; wherein generating the placement map based, at least in part, on the overload probability comprises generating the placement map based, at least in part, on the overall probability of system overload.

K: A method as any of Paragraphs A-J recites, further comprising calculating a monetary cost of hosting the service.

L: A system comprising: a data center definition store maintaining a data center definition that models infrastructure components of a data center, wherein the infrastructure components of the data center are specified according to a data center definition language; a service definition store maintaining a service definition that includes rules and architecture requirements for a service to be hosted by the data center, wherein the rules and architecture requirements are specified according to a service definition language; a calculator module configured to generate a model based at least in part on one or more of a state of the data center, the data center definition, and the service definition; a placement map generator configured to generate a placement map based at least in part on the model and one or more configuration parameters; and a deployment engine configured to deploy the service within the data center according to the placement map.

M: A system as Paragraph L recites, further comprising a service requirements and rules editor configured to provide a user interface for specifying the service definition.

N: A system as Paragraph L or Paragraph M recites, further comprising a data center requirements and rules editor configured to provide a user interface for specifying the data center definition.

O: A system as any of Paragraphs L-N recites, further comprising a monitoring module configured to: monitor operational output of deployed services; apply machine learning techniques to the operational output; and update one or more of the configuration parameters.

P: A system as any of Paragraphs L-O recites, further comprising a placement map viewer and editor configured to: provide a user interface for viewing the placement map; compare the placement map to rules associated with the data center; compare the placement map to rules associated with one or more services; and modify the placement map in response to user input.

Q: A system as any of Paragraph L-P recites, further comprising a data center state store configured to maintain data that describes a state of the data center.

R: One or more computer-readable media comprising computer-executable instructions that, when executed, direct a computing system to perform operations comprising: modeling a data center using a data center definition language; receiving a service definition specified in a service definition language; generating a placement map that models a deployment of the service within the data center; and deploying the service according to the placement map such that the service is hosted by the data center.

S: One or more computer-readable media as Paragraph R recites, wherein generating the placement map comprises one or more of: configuring the placement map based on estimated cost; configuring the placement map based on estimated availability; or configuring the placement map based on estimated resource consumption.

T: One or more computer-readable media as Paragraph R or Paragraph S recites, wherein generating the placement map comprises: using parameterized distributions to estimate resource consumption based, at least in part, on historical data and machine learning; predicting future resource consumption based, at least in part, on the estimated resource consumption; estimating resource consumption correlation based on the predicted future resource consumption to avoid co-placement of unfavorably correlated services; and configuring the placement map based on a probability that the predicted future resource consumption will result in a service level agreement violation.

CONCLUSION

Although intelligent placement within a data center has been described in language specific to structural features and/or methodological steps, it is to be understood that intelligent placement within a data center as defined in the appended claims is not necessarily limited to the specific features or steps described above. Rather, the specific features and steps described above are disclosed as examples of implementing the claims and other equivalent features and steps are intended to be within the scope of the claims.

We claim:

1. A method comprising:
   identifying a model of resource allocations to support deployment of a service by a provider;
   generating a visual representation of the resource allocations for deployment of the service based on the model of resource allocations, the visual representation comprising a placement map that includes:
   a visual representation of a plurality of different availability groupings of hardware servers, each different availability grouping of hardware servers in the plurality of different availability groupings of hardware servers containing a plurality of visual representations of a plurality of different servers, wherein each visual representation of a different server within the different availability groupings of hardware servers includes a visual representation of one or more virtual machines being hosted by that different server, and wherein each of the different availability groupings of hardware servers is visually distinguished within the placement map from all other different availability groupings of hardware servers contained in a remainder of the availability groupings of hardware servers.

2. The method of claim 1, wherein the plurality of visual representations corresponding to the plurality of servers includes at least a first server icon that identifies only a single virtual machine and at least a first server icon that identifies a plurality of virtual machines.

3. The method of claim 1, wherein the plurality of visual representations of the servers include, within at least one visual representation of a particular server, a first identifier that identifies processing cores being consumed by the particular server and a second identifier that identifies memory being consumed by the particular server.

4. The method of claim 1, wherein the plurality of visual representations of the virtual machines include at least one visual representation of a particular virtual machine within at least one visual representation of a particular server, the visual representation of the particular virtual machine including a graphical icon representing a purpose for the particular virtual machine.

5. The method of claim 1, wherein the plurality of visual representations of the servers contain different icons to visually differentiate servers by type.

6. The method of claim 1, wherein the plurality of visual representations of the servers include icons that reflect magnitudes of resources available by each of the servers.

7. The method of claim 1, wherein the provider is a data center containing hardware servers corresponding to the visual representation of the plurality of servers.

8. The method of claim 1, wherein the model of resource allocations is based on a service definition that specifies rules and requirements for the service.

9. A computing system comprising:
   one or more processor; and
   one or more storage device having stored computer-executable instructions which are executable by the one or more processors to implement a method comprising:
   identifying a model of resource allocations to support deployment of a service by a provider;

generating a visual representation of the resource allocations for deployment of the service based on the model of resource allocations, the visual representation comprising a placement map that includes:
a visual representation of a plurality of different availability groupings of hardware servers, each different availability grouping of hardware servers in the plurality of different availability groupings of hardware servers containing a plurality of visual representations of a plurality of different servers, wherein each visual representation of a different server within the different availability groupings of hardware servers includes a visual representation of one or more virtual machines being hosted by that different server, and wherein each of the different availability groupings of hardware servers is visually distinguished within the placement map from all other different availability groupings of hardware servers contained in a remainder of the availability groupings of hardware servers.

10. The computing system of claim 9, wherein the plurality of visual representations corresponding to the plurality of servers includes at least a first server icon that identifies only a single virtual machine and at least a first server icon that identifies a plurality of virtual machines.

11. The computing system of claim 9, wherein the plurality of visual representations of the servers include, within at least one visual representation of a particular server, a first identifier that identifies processing cores being consumed by the particular server and a second identifier that identifies memory being consumed by the particular server.

12. The computing system of claim 9, wherein the plurality of visual representations of the virtual machines include at least one visual representation of a particular virtual machine within at least one visual representation of a particular server, the visual representation of the particular virtual machine including a graphical icon representing a purpose for the particular virtual machine.

13. The computing system of claim 9, wherein the plurality of visual representations of the servers contain different icons to visually differentiate servers by type.

14. The computing system of claim 9, wherein the plurality of visual representations of the servers include icons that reflect magnitudes of resources available by each of the servers.

15. The computing system of claim 9, wherein the provider is a data center containing hardware servers corresponding to the visual representation of the plurality of servers.

16. The computing system of claim 9, wherein the model of resource allocations is based on a service definition that specifies rules and requirements for the service.

17. A computer program product comprising one or more hardware storage device having stored computer-executable instructions which are executable by one or more processors of a computing system to implement a method comprising:
identifying a model of resource allocations to support deployment of a service by a provider;
generating a visual representation of the resource allocations for deployment of the service based on the model of resource allocations, the visual representation comprising a placement map that includes:
a visual representation of a plurality of different availability groupings of hardware servers, each different availability grouping of hardware servers in the plurality of different availability groupings of hardware servers containing a plurality of visual representations of a plurality of different servers, wherein each visual representation of a different server within the different availability groupings of hardware servers includes a visual representation of one or more virtual machines being hosted by that different server, and wherein each of the different availability groupings of hardware servers is visually distinguished within the placement map from all other different availability groupings of hardware servers contained in a remainder of the availability groupings of hardware servers.

18. The computer program product of claim 17, wherein the plurality of visual representations of the servers include, within at least one visual representation of a particular server, a first identifier that identifies processing cores being consumed by the particular server and a second identifier that identifies memory being consumed by the particular server.

19. The computer program product of claim 17, wherein the plurality of visual representations of the servers contain different icons within visual representations of the servers, the icons visually differentiating the servers by type.

* * * * *